Oct. 19, 1971     H. W. RITCHEY     3,613,374
THRUST-TERMINATION NOZZLE FOR A SOLID-PROPELLANT
ROCKET ENGINE

Filed June 24, 1958     6 Sheets-Sheet 1

INVENTOR.
HAROLD W. RITCHEY

INVENTOR.
HAROLD W. RITCHEY

INVENTOR.
HAROLD W. RITCHEY

INVENTOR.
HAROLD W. RITCHEY

Oct. 19, 1971

H. W. RITCHEY 3,613,374

THRUST-TERMINATION NOZZLE FOR A SOLID-PROPELLANT ROCKET ENGINE

Filed June 24, 1958

INVENTOR.
HAROLD W. RITCHEY

Oct. 19, 1971 H. W. RITCHEY 3,613,374
THRUST-TERMINATION NOZZLE FOR A SOLID-PROPELLANT
ROCKET ENGINE
Filed June 24, 1958 6 Sheets-Sheet 6

INVENTOR.
HAROLD W. RITCHEY

United States Patent Office 3,613,374
Patented Oct. 19, 1971

3,613,374
THRUST-TERMINATION NOZZLE FOR A SOLID-PROPELLANT ROCKET ENGINE
Harold W. Ritchey, Huntsville, Ala., assignor to Thiokol Chemical Corporation, Trenton, N.J.
Filed June 24, 1958, Ser. No. 745,237
Int. Cl. C06d 5/00
U.S. Cl. 60—219          1 Claim This invention relates to rockets and more particularly to a device for terminating the thrust of same.

An object of this invention is to provide a novel system for rapidly terminating the thrust of a solid-propellant rocket engine. Another object is to provide a rocket engine nozzle of which a fixed portion can be released at the desired time, thus discontinuing the burning of the solid propellant contained therein. Still another object is to provide a means for terminating the thrust of a solid-propellant rocket-engine by reducing the internal pressure. Still another object is to provide a solid-propellant rocket-engine nozzle, the throat area of which can be increased at any instant during flight of the vehicle to a point at which burning of the propellant will cease due to reduction of internal pressure below a critical point.

Prior to this invention there were no practicable means of terminating the thrust of a solid-propellant rocket engine in flight before the normal burnout of the propellant, which is fixed by the configuration and burning rate of the propellant. I have found that the burning of the propellant in a solid-propellant rocket engine can be extinguished by sudden reduction of the pressure in the combustion chamber. The present invention permits immediate thrust termination of any solid-propellant rocket engine at any time during operation by suddenly increasing the area for escaping gases so that the consequent rapid decrease in pressure causes the burning of the solid-propellant charge to cease. This increase may be accomplished by substitution of a larger opening for the exhaust nozzle. It is obvious that the same effect would result from the creation of additional openings at any part of the rocket-engine case.

In accordance with a preferred embodiment of this invention, a rocket engine is provided with a nozzle so constructed that a predetermined portion of the nozzle can be blown off at the desired time by a rotating ball-release mechanism. Another mechanism for release of the predetermined portion of the nozzle utilizes a U-band surrounding the nozzle in an annular manner at the point where blowoff is desired.

Thrust is the propulsive force created by the exhaust gases emitted from the nozzle of a rocket engine as a result of the combustion of the propellant contained within the burning chamber. The area change necessary to cause thrust cut-off varies with operating pressure and type of propellant. Operation of the thrust termination mechanism may be initiated either electrically or mechanically. The system may be triggered by a signal from an integrating accelerometer or other device that senses acceleration, velocity, or position of the vehicle being propelled. To decrease the transient thrust that would be produced by release of full chamber pressure in a single step, the area of the exit opening may be enlarged in two or more increments, with the area ratio of the final increment sufficient to extinguish the combustion. This two-stage reduction may be desirable in engines operating at relatively high chamber pressure.

The many objects and advantages of the present invention may be best understood and appreciated by referring to the accompanying drawing which illustrates a thrust-termination nozzle for a solid-propellant rocket engine incorporating a preferred embodiment of the invention and wherein.

Figure 1:
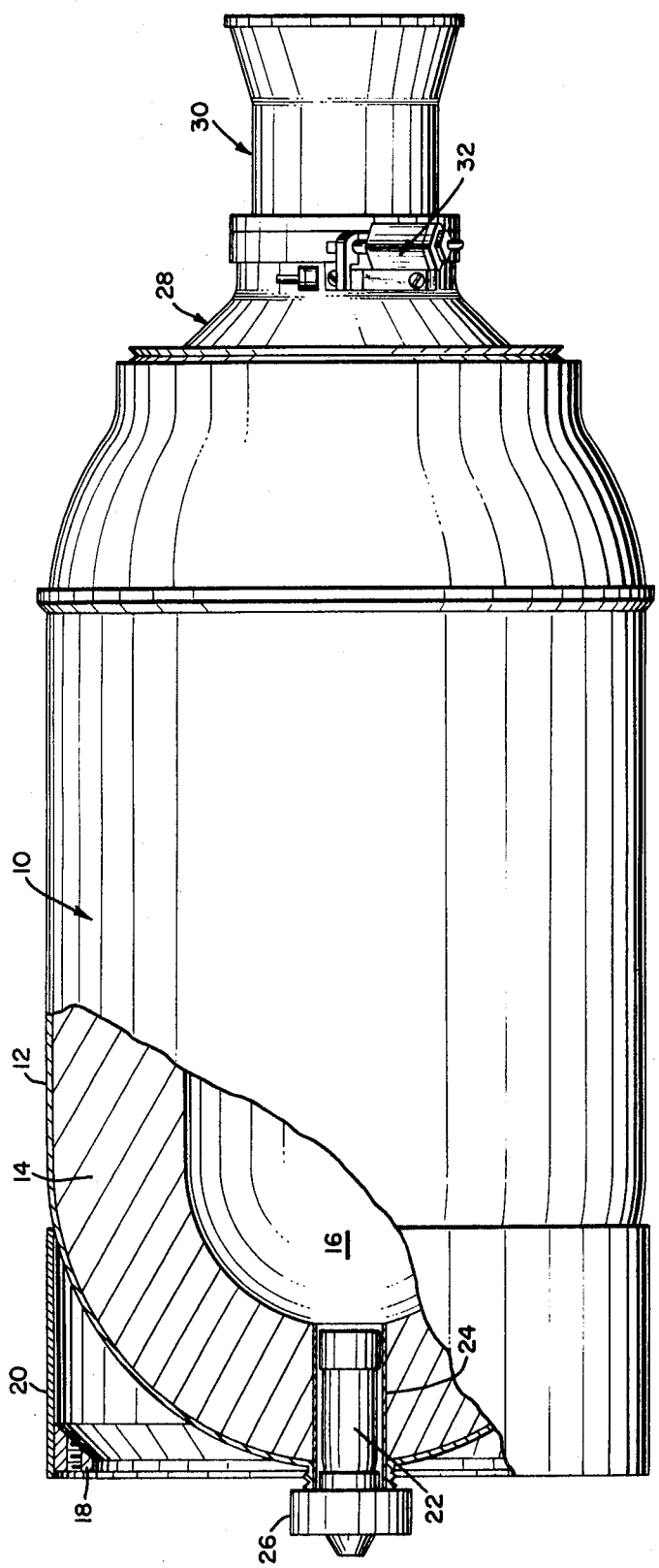
FIG. 1 is a side view, partly in cross section, showing a rocket engine embodying one form of nozzle release mechanism for thrust termination.

Referring to the drawing, and more particularly to FIG. 1, the rocket engine 10 there shown comprises a thin-walled cylindrical metal casing 12 having a hollow cylindrical propellant grain 14 cast therein to form a central passage 16 extending through the center of the rocket engine 10. At its forward (left-hand) end casing 12 is provided with a mounting ring 18 joined to the casing 12 by a metal sleeve 20. Inserted into the forward end of the casing 12 is a conventionally electrically activated igniter 22 enclosed in a protective casing 24 and held in place by a retainer ring 26 threaded to a boss on the forward end of the rocket engine casing 12. Assembled to the rear of the rocket engine 10 by means of an adapter 28 is a nozzle 30, to the outside of which is attached a ball release mechanism 32.

Figure 2:
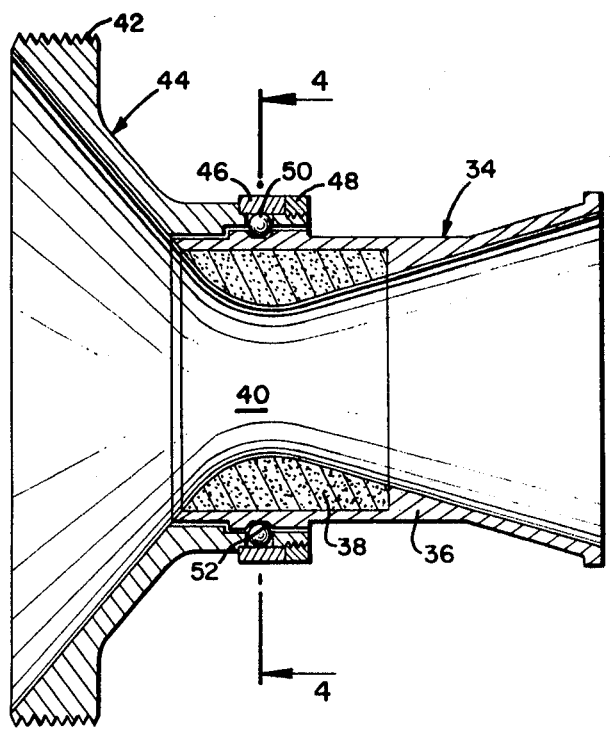
FIG. 2 is a central longitudinal section through the nozzle showing the nozzle release mechanism of FIG. 1 therein prior to activation.

The details of the ball release mechanism 32 are best shown in FIG. 2, FIG. 3, FIG. 4, and FIG. 5. Referring first to FIG. 2, the nozzle 34 comprises an annular metal sleeve 36 having therein a carbon insert 38 with converging and diverging portions that cooperate to define a nozzle throat 40. Threads 42 are provided on the adapter 44 for attaching the nozzle 34 to the engine casing. Surrounding the metal sleeve 36 at the throat portion of the nozzle 34 is a retaining ring 46 held in place on the right-hand side by a second ring 48 threaded to the adapter 44. Just inside the retaining ring 46 is a plurality of metal balls, each ball 50 sunk slightly into a recess 52 in the metal sleeve 36 sufficiently to hold it in place until the retaining ring 46 is moved clockwise by an activating device shown in FIG. 4 and FIG. 5.

Figure 3:
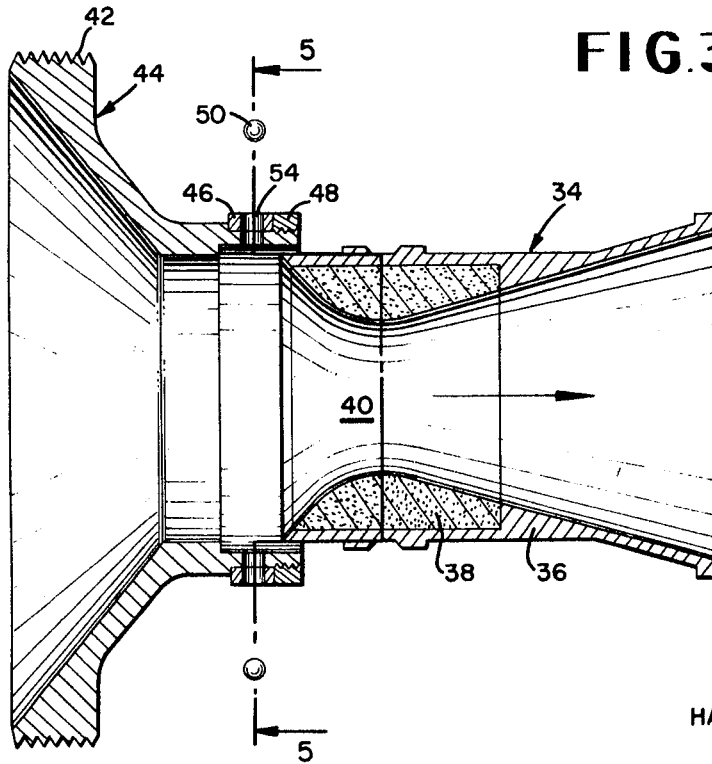
FIG. 3 is a central longitudinal section through the nozzle showing the nozzle release mechanism of FIG. 1 therein after activation.

Referring now to FIG. 3, upon this clockwise movement, each ball 50 is ejected through an opening 54 immediately radially outward from the original position of the ball. It can readily be seen that upon release of the balls the whole nozzle 34 will move rearward in the direction of the arrow, separating entirely from the remainder of the rocket engine and leaving a throat area large enough to cause automatic extinguishing of the propellant flame.

Figure 4:
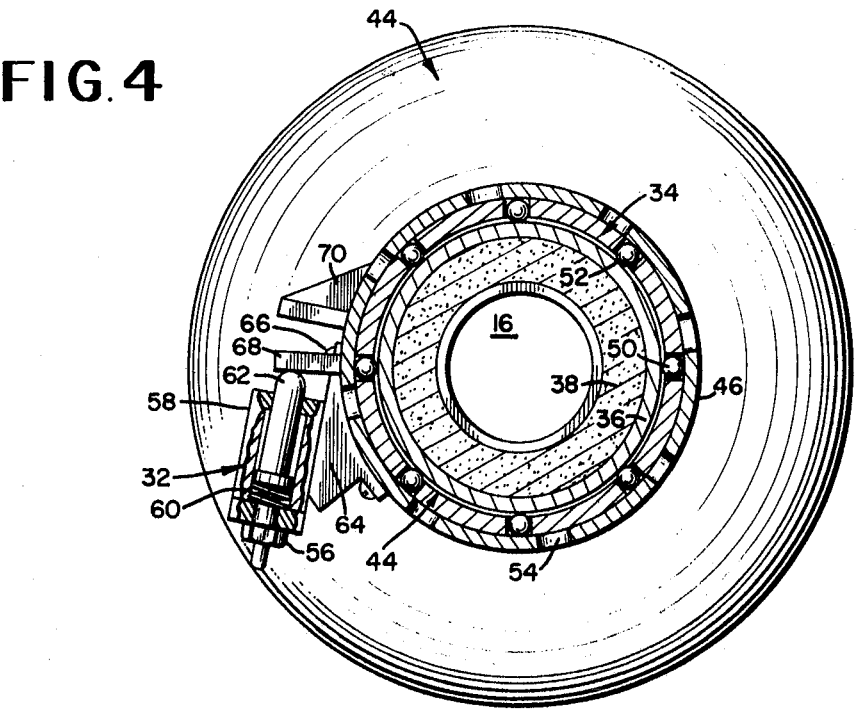
FIG. 4 is a transverse section through the nozzle taken on line 4—4 of FIG. 2, showing the nozzle release mechanism prior to activation.

Referring next to FIG. 4, in which the ball release mechanism 32 is shown in detail, a squib 56 containing an explosive charge which may be electrically or otherwise ignited is inserted into the end of a housing 58 containing a spring 60 and piston 62. The ball release mechanism 32 is welded to a mounting flange 64, which holds it in place and is attached to the adapter 44 by a plurality of screws 66. During normal flight of the rocket engine, the piston 62, remains in a retracted position, its forward end resting against a post 68 projecting radially from the retainer ring 46. Each ball 50 is sunk slightly into a recess 52 in the metal sleeve 36.

Figure 5:
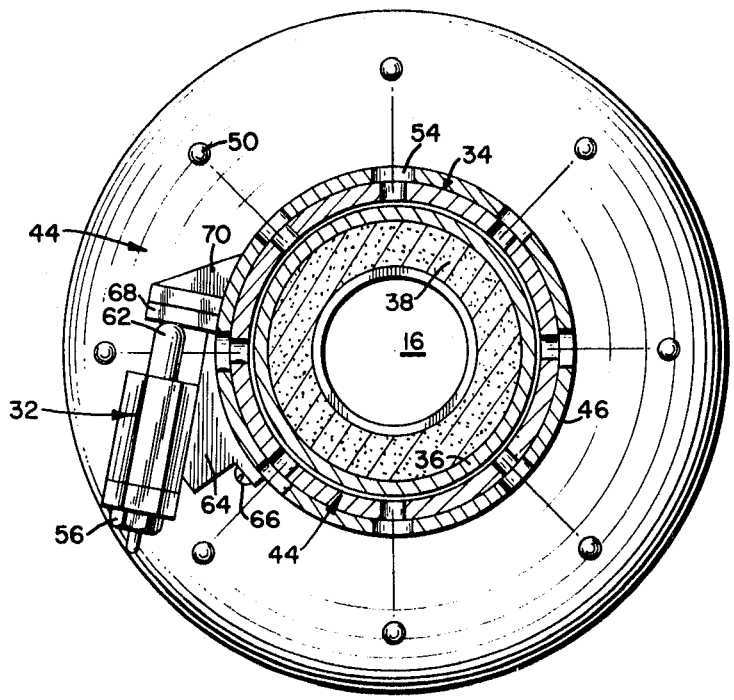
FIG. 5 is a transverse section through the nozzle taken on line 5—5 of FIG. 3 showing the nozzle release mechanism after activation.

Referring now to FIG. 5, which shows the ball release mechanism 32 in an activated position, when it is desired to stop the engine, the squib 56 is ignited to move piston 62 upwardly. The retainer ring 46 is supplied with a plurality of openings 54 at regular intervals. Each opening 54 is in a position such that immediately upon activation of the ball release mechanism 32, it moves clockwise sufficiently when the piston strikes the post 68 and pushes it against the stop bar 70 extending radially from the adapter 44 for the balls 50 to be ejected through the opening 54 and the nozzle to move rearward and be completely released from the remainder of the rocket engine. The rapid decrease in pressure caused by increasing the nozzle throat area causes the propellant to stop burning and the thrust or motive force to be terminated.

Figure 6:
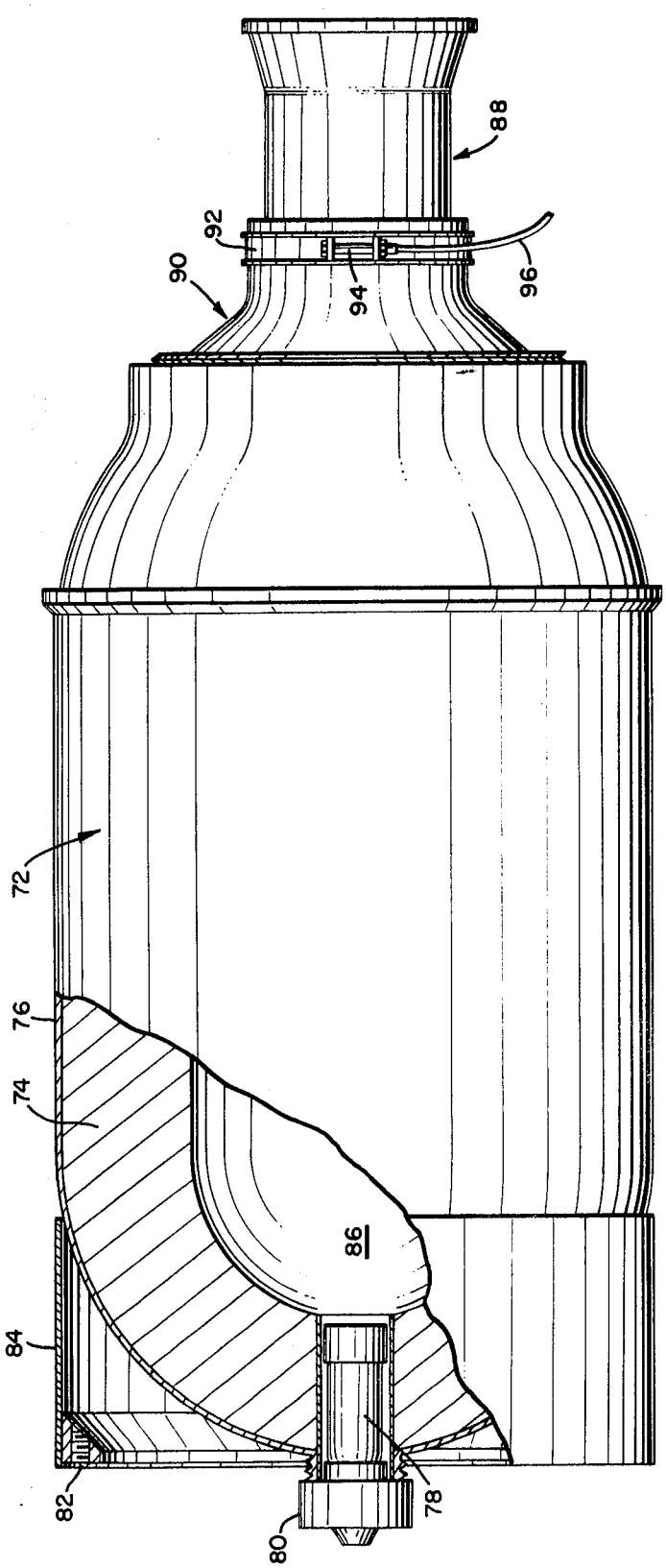
FIG. 6 is a side view, partly in cross section, showing a rocket engine embodying another form of nozzle release mechanism.

In FIG. 6 is seen another form of a rocket engine 72 according to the present invention wherein the propellant 74 is bonded to a thin-walled cylindrical casing 76. At its forward (left-hand) end casing 76 is provided with a mounting ring 82 joined to the casing 76 by a metal sleeve 84. Inserted at the forward end of the casing 76 into a central passage 86 passing through the rocket engine 72 along a longitudinal axis is a conventionally electrically activated igniter 78 held in place by a retainer ring 80 threaded to the casing 76. At the (right-hand) end, the nozzle 88 is joined to the rocket engine 72 by means of an adapter 90. Surrounding the throat portion of the nozzle is a ball-retainer ring 92 comprising two semicircular portions held together by a pair of explosive bolts 94 to which an electric current may be conducted by lead wires 96.

Figure 7:
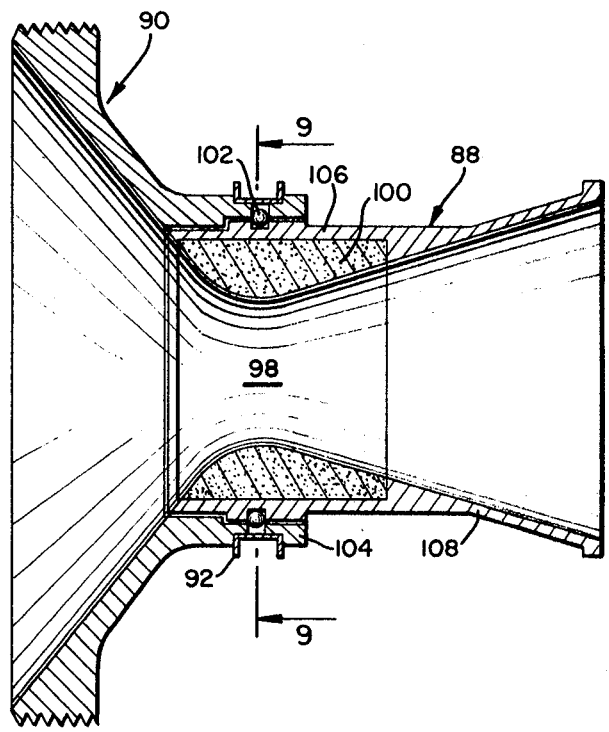
FIG. 7 is a central longitudinal section through the nozzle showing the nozzle release mechanism of FIG. 6 therein prior to activation.

Referring now to FIG. 7, the explosive bolt release device comprises a plurality of balls 102 surrounding the nozzle throat 98, which is defined by a carbon insert 100. Each ball 102 is fitted into a recess 104 in an elevated portion 106 of the nozzle housing 108. The nozzle 88 is attached to the rocket engine by the threaded adapter 90.

The grooved retainer ring 92 prevents the balls from being released until activation of the explosive bolts 94.

Figure 8:
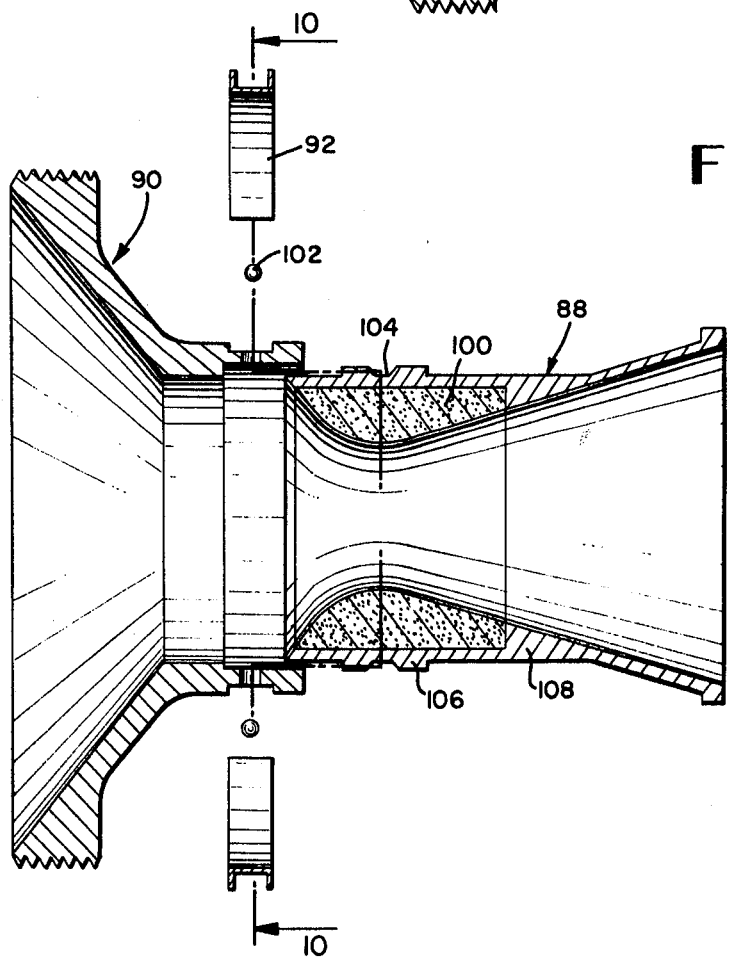
FIG. 8 is a central longitudinal section through the nozzle showing the nozzle release mechanism of FIG. 6 therein after activation.

In FIG. 8 is shown the nozzle 88 after activation of the explosive bolt mechanism. The retainer ring 92 has been blown off, and each ball 102 has been ejected, the nozzle 88 having been completely separated from the adapter 90 when nothing was left to hold it in place. The throat area thus becomes large enough to decrease pressure within the engine casing to a point where combustion of the propellant will cease.

Figure 9:
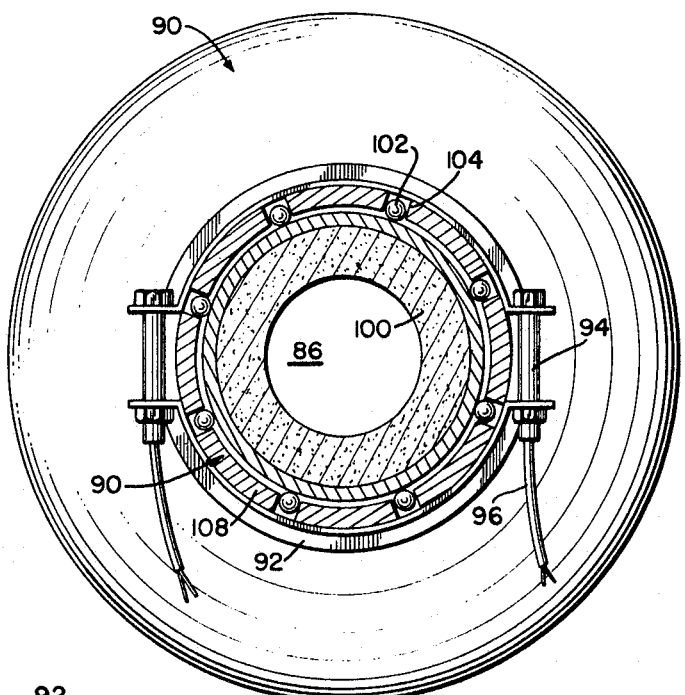
FIG. 9 is a transverse section through the nozzle taken on line 9—9 of FIG. 7 showing the nozzle release mechanism prior to activation.

In FIG. 9 the explosive bolt 94, together with lead wires 96 and the balls 102 retained in their slots 104 in the nozzle housing 108 by the retainer ring 92 around the carbon insert 100, are shown as they appear in their normal flight position.

Figure 10:
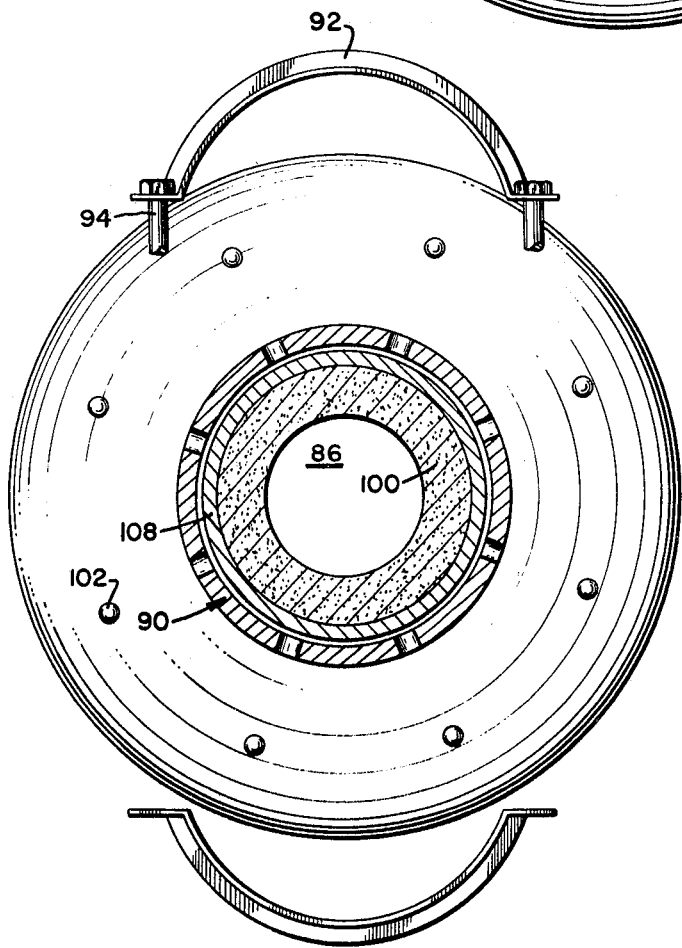
FIG. 10 is a transverse section through the nozzle taken on line 10—10 of FIG. 8 showing the nozzle release mechanism after activation.

FIG. 10 shows the parts of the ring 92, balls 102, and bolts 94 as they might appear immediately after activation of the explosive bolt mechanism.

The invention should not be construed as limited to the details of the particular embodiments shown and described, which are given by way of illustration rather than limitation, and the invention should not be limited except in accordance with the appended claim.

I claim:

1. The method of terminating, in flight, the thrust generated by the burning of a solid propellant charge in a rocket engine comprising a casing terminating in rearward portions in a constricted throat and having a detachable nozzle of cross-sectional area smaller than the constricted throat of said casing, said detachable nozzle being positioned within said throat, which method comprises detaching said nozzle from said casing while said propellant is burning, thus suddenly increasing the area for escaping gases, whereby the pressure in said casing is suddenly reduced and said propellant is thereby extinguished.

References Cited

UNITED STATES PATENTS

| | | | |
|---|---|---|---|
| 2,493,725 | 1/1950 | McMorris | 60—35.6 |
| 2,583,570 | 1/1952 | Hickman | 60—35.6 |
| 2,766,581 | 10/1956 | Welsh | 60—35/35.6 U |
| 2,596,644 | 5/1952 | Bradford et al. | 60—253 |
| 2,788,243 | 4/1957 | Goodliffe et al. | 285—277 |
| 2,850,976 | 9/1958 | Seifert | 60—254 |

LELAND A. SEBASTIAN, Primary Examiner

U.S. Cl. X.R.

60—253, 254, 271